(No Model.)
H. H. CHRISTIE.
SCHOOL SLATE.
No. 339,618. Patented Apr. 13, 1886.
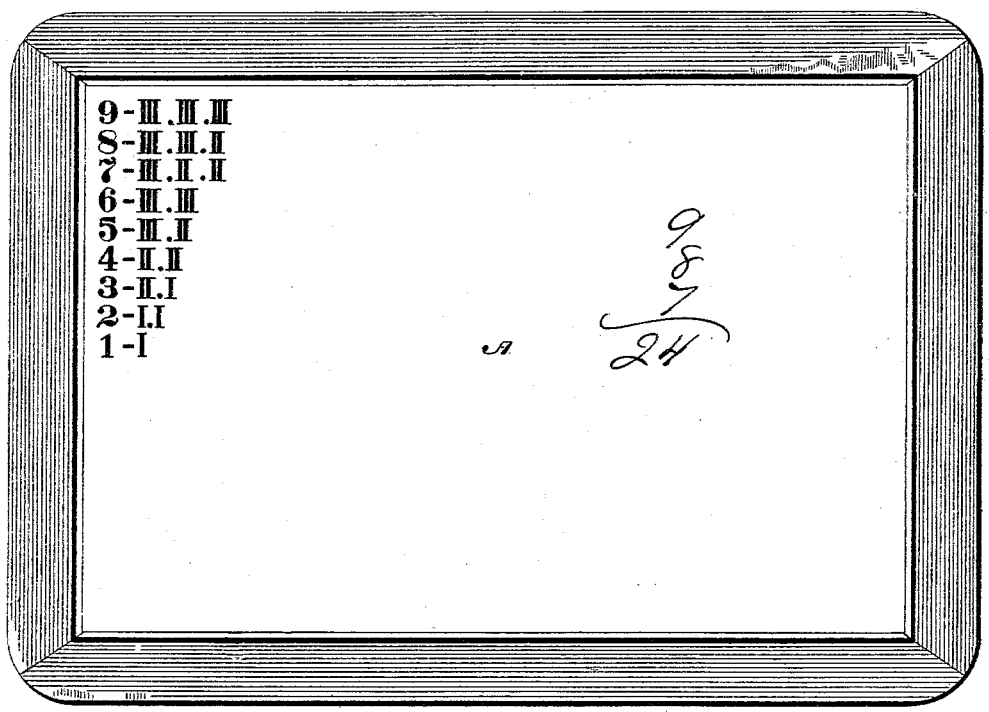

UNITED STATES PATENT OFFICE.

HERMAN H. CHRISTIE, OF HERKIMER, NEW YORK.

SCHOOL-SLATE.

SPECIFICATION forming part of Letters Patent No. 339,618, dated April 13, 1886.

Application filed January 8, 1886. Serial No. 188,019. (No model.)

*To all whom it may concern:*

Be it known that I, HERMAN H. CHRISTIE, a citizen of the United States, residing at Herkimer, in the county of Herkimer and State of New York, have invented a new and useful Improvement in Slates, of which the following is a specification, reference being had to the accompanying drawings.

My invention relates to an improvement in slates to be used by pupils in learning to add; and it consists in a slate inscribed with a column of figures from 1 to 9, each figure being accompanied with a series of marks representing its units; and the object of my invention is to avoid the necessity of counting up on the fingers, and also the necessity of writing down or carrying in the memory the sum of any number of figures in a column while adding the said column, as will be more fully set forth hereinafter.

The accompanying drawing represents a slate embodying my invention.

A represents a slate, which may be of any preferred construction. In one corner of this slate is inscribed a column of figures from 1 to 9, and on the right of each figure are inscribed a number of marks representing its units. For example, the figure 4 will be accompanied by a series of four marks representing its units, thus: 1 1 1 1.

In order to assist the child in learning to add numbers whose sum is less than ten, these series of marks are spaced into ones, twos, and threes, as shown, and the child will be taught to add them thus: "One and one are two, two and one are three, two and two are four, three and two are five," &c., until the number nine is reached.

In adding numbers whose sum is more than ten, as, for example, 8 and 9 and 7, the pupil will proceed to count the marks representing these figures until he reaches their sum, 24.

The column of figures and their accompanying series of marks will be indelibly inscribed on the slate, so that they will not be obliterated when the slate is cleaned.

A slate thus inscribed will be found very useful in teaching children to add, and is very easily and cheaply provided.

Having thus described my invention, I claim—

A slate indelibly inscribed with a column of figures representing the numerals, and a series of marks accompanying each figure corresponding to the number of its units, the said series of marks being spaced into ones, twos, and threes, for the purpose set forth, substantially as described.

In testimony that I claim the foregoing as my own, I have hereto affixed my signature in presence of two witnesses.

HERMAN H. CHRISTIE.

Witnesses:
GEORGE F. SMALL,
F. E. EASTON.